United States Patent
Wong et al.

(10) Patent No.: US 10,225,864 B2
(45) Date of Patent: Mar. 5, 2019

(54) METHOD AND APPARATUS FOR SCHEDULING CTS IN A COMMUNICATION NETWORK

(71) Applicant: Alcatel Lucent, Boulogne-Billancourt (FR)

(72) Inventors: Shin Horng Wong, Chippenham (GB); Teck Hu, Melbourne, FL (US); Feng Han, Shanghai (CN)

(73) Assignee: Alcatel Lucent, Boulonge-Billancourt (FR)

( * ) Notice: Subject to any disclaimer, the term of this patent is extended or adjusted under 35 U.S.C. 154(b) by 28 days.

(21) Appl. No.: 15/512,201

(22) PCT Filed: Sep. 4, 2015

(86) PCT No.: PCT/IB2015/001897
§ 371 (c)(1),
(2) Date: Mar. 17, 2017

(87) PCT Pub. No.: WO2016/046626
PCT Pub. Date: Mar. 31, 2016

(65) Prior Publication Data
US 2017/0273111 A1    Sep. 21, 2017

(30) Foreign Application Priority Data
Sep. 24, 2014   (CN) .......................... 2014 1 0497309

(51) Int. Cl.
*H04W 74/08*    (2009.01)
*H04W 72/04*    (2009.01)
*H04W 88/02*    (2009.01)

(52) U.S. Cl.
CPC ... *H04W 74/0816* (2013.01); *H04W 72/0446* (2013.01); *H04W 88/02* (2013.01)

(58) Field of Classification Search
CPC ......... H04W 74/0816; H04W 72/0446; H04W 88/02
See application file for complete search history.

(56) References Cited

U.S. PATENT DOCUMENTS

2011/0028102 A1   2/2011  Li et al.
2014/0341018 A1*  11/2014 Bhushan .......... H04W 28/0289
                                                            370/230

(Continued)

FOREIGN PATENT DOCUMENTS

CN    102474727 A    5/2012
CN    102892206 A    1/2013

(Continued)

OTHER PUBLICATIONS

International Search Report PCT/ISA/210 for International Application No. PCT/IB2015/001897 dated Jan. 15, 2016.

(Continued)

*Primary Examiner* — Thai Nguyen
(74) *Attorney, Agent, or Firm* — Harness, Dickey & Pierce, P.L.C.

(57) ABSTRACT

The invention provides the method and apparatus for node and UE to schedule and transmit CTS in a communication network. The method comprises that a node transmits a RTS for indicating a CTS scheduling information to a LTE in an unlicensed band, wherein the scheduling information is used to indicate the LTE to send a CTS in uplink licensed band in response to the RTS. The CTS scheduling information may explicitly include time resource and frequency resource for the UE to transmit the CTS. The CTS scheduling information may implicitly indicate the time and frequency resource for the UE to transmit the CTS. Based on the explicit or implicit schemes of the present application, the scheduling signaling overhead can be reduced and the (Continued)

co-existence problem between LTE-U/LTE-U or between LTE-U/Wi-Fi can be efficiently mitigated.

19 Claims, 2 Drawing Sheets

(56) References Cited

U.S. PATENT DOCUMENTS

| | | |
|---|---|---|
| 2014/0341024 A1 | 11/2014 | Bhushan et al. |
| 2014/0341035 A1 | 11/2014 | Bhushan et al. |
| 2014/0341053 A1 | 11/2014 | Bhushan et al. |
| 2014/0341135 A1 | 11/2014 | Bhushan et al. |
| 2014/0341207 A1 | 11/2014 | Bhushan et al. |
| 2014/0342745 A1 | 11/2014 | Bhushan et al. |
| 2015/0327297 A1 | 11/2015 | Nilsson et al. |
| 2016/0021679 A1* | 1/2016 | Jose .................. H04W 72/1278 370/329 |

FOREIGN PATENT DOCUMENTS

| | | |
|---|---|---|
| EP | 2757850 A1 | 7/2014 |
| WO | WO-2014/189915 A2 | 11/2014 |

OTHER PUBLICATIONS

Huawei et al., "Scope and Workplan for the Study on Licensed-Assisted Access", 3GPP TSG RAN Meeting #65, RP-141615, Sep. 12, 2014, pp. 1-13.

* cited by examiner

METHOD AND APPARATUS FOR SCHEDULING CTS IN A COMMUNICATION NETWORK

CROSS-REFERENCE TO RELATED APPLICATIONS

This application claims the benefit of International no. PCT/IB2015/001897, filed on Sep. 4, 2015 which in turn claims the priority of Chinese patent application no. 201410497309.6 filed on Sep. 24, 2014 the content of each of which is incorporated herein by reference in its entirety.

FIELD OF THE INVENTION

The application relates to a wireless communication field, and particularly to a method and apparatus for scheduling CTS in a communication network.

BACKGROUND OF THE INVENTION

With the increasing traffic demand, cellular operators require more spectrums in addition to a licensed band. The Long Term Evolution (LTE) deployment in an unlicensed band (LTE-U), typically over 5 GHz, can be potentially implemented to offload mass traffic from the licensed carriers. A Study Item on LTE-U has been initiated in 3rd Generation Partner Project (3GPP) Rel-13 for standardization of this feature. The first stage of LTE-U would consist of utilizing the unlicensed band for supplementary downlink (SDL) and the uplink is sent using the licensed band. Since LTE-U may partially operate in the unlicensed band, it would have to co-exist with other network, particularly other LTE-U and Wi-Fi (e.g. 802.11ac).

The hidden terminal is a well-known problem in Wi-Fi. FIG. 1 illustrates a schematic view of hidden terminal interference between APs. FIG. 1 contains two Wi-Fi Access Points (AP): AP#1 and AP2. Terminal 1 is connected to AP1 whilst Terminal 2 is connected to AP2. AP1 cannot hear the transmission from AP2 but Terminal 2 can hear both AP#1 and AP2 transmission. Whilst AP2 is transmitting data to Terminal 2, AP#1 failing to sense AP2 transmission may transmit data to Terminal 1, which causes interference to Terminal 2.

Therefore, carrier sense multiple access with collision avoidance (CSMA/CA) is introduced in Wi-Fi to mitigate the hidden terminal problem. FIG. 2 illustrates a schematic view of CSMA/CA for avoiding hidden terminal interference between Wi-Fi APs. As illustrated in FIG. 2, AP2 transmits a "Request to Send" (RTS) to Terminal 2 prior to transmitting any actual data. Any terminals detecting the RTS would refrain from transmission. In response to the RTS, Terminal 2 would sense the channel and if it is free, it would response with a "Clear to Send" (CTS) back to AP#2. Similarly any terminal that can detect the CTS will refrain from transmitting. In FIG. 2, AP1 would detect the CTS and would not transmit data to Terminal 1. Upon receiving the CTS from Terminal 2, AP2 would start its data transmission to Terminal 2. In this way the Terminal 2 would avoid being interfered by AP1.

The CSMA/CA mechanism can also be adopted in LTE-U for LTE-U/LTE-U and LTE-U/Wi-Fi coexistence. However, it should be appreciated that LTE-U and Wi-Fi have different methods of operation. That is, in Wi-Fi transmission from a terminal is based on contention, i.e. a terminal would seize the channel when it is available. In contrast, in LTE-U, resources are managed and scheduled by the eNB. Since one possible mode of operation of LTE-U is for downlink transmission only, the CTS from the (LTE-U) UE to the eNB is transmitted in the licensed band. How to schedule the resource for CTS transmission in licensed uplink band is an essential problem to be solved.

OBJECT AND SUMMARY OF THE INVENTION

As mentioned above, as LTE-U has different channel access operation than that of Wi-Fi system, there is a co-existence problem between LTE-U/LTE-U or between LTE-U/Wi-Fi, in view of this, it would be desirable to provide an efficient scheme for scheduling CTS transmission.

According to a first aspect of the invention, there is provided a method for a node to schedule a CTS in a communication network, the method comprising the steps of: transmitting a RTS for indicating a CTS scheduling information to a UE in an unlicensed band, the CTS scheduling information indicates the UE to send a CTS in an uplink licensed band in response to the RTS.

Advantageously, the CTS scheduling information includes time resource and frequency resource for the UE to transmit the CTS.

Advantageously, the CTS scheduling information includes a sub-frame indicator which indicates the UE to transmit the CTS in the sub-frame indicated by the sub-frame indicator.

Advantageously, the method further comprises transmitting a pre-RTS before transmitting the RTS, wherein the pre-RTS indicates the UE to search the RTS and the RTS includes a CTS-RNTI information for the UE to decode the RTS.

Advantageously, the pre-RTS indicates the UE to search the RTS in a pre-defined sub-frame associated with the pre-RTS.

Advantageously, the pre-RTS further includes a second sub-frame indicator for indicating the UE to search the RTS in the sub-frame indicated by the second sub-frame indicator.

Advantageously, the resource for transmitting the RTS indicates the frequency and time resource for the UE to transmit the CTS.

Advantageously, the RTS includes an indicator for indicating the UE to transmit one or more CTS.

Advantageously, the CTS scheduling information indicates that the RTS does not include CTS scheduling information.

Advantageously, the method further comprises receiving the CTS from the UE in the licensed band.

According to a second aspect of the invention, there is provided a method for a UE to transmit a CTS in a communication system, the method comprising the steps of: receiving a RTS for indicating a CTS scheduling information from a node in an unlicensed band, the CTS scheduling information indicates the UE to send a CTS in an uplink licensed band in response to the RTS; and transmitting the CTS based on the received CTS scheduling information.

Advantageously, the CTS scheduling information includes time resource and frequency resource for the UE to transmit the CTS.

Advantageously, the CTS scheduling information includes a sub-frame indicator which indicates the UE to transmit the CTS in the sub-frame indicated by the sub-frame indicator.

Advantageously, the method further comprises transmitting a pre-RTS before transmitting the RTS, wherein the pre-RTS indicates the UE to search the RTS, which includes a CTS-RNTI information for the UE to decode the RTS.

Advantageously, the pre-RTS indicates the UE to search the RTS in a pre-defined sub-frame associated with the pre-RTS.

Advantageously, the pre-RTS further includes a second sub-frame indicator, which indicates the UE to search the RTS in the sub-frame indicated by the second sub-frame indicator.

Advantageously, the resource for transmitting the RTS indicates the time and frequency resource for the UE to transmit the CTS.

Advantageously, the RTS includes an indicator for indicating the UE to transmit one or more CTS, when the indicator indicates the UE to transmit one CTS, the UE transmit the CTS in the uplink licensed band.

Advantageously, the CTS is transmitted in PUSCH or PUCCH in the uplink licensed band.

According to a third aspect of the invention, there is provided an apparatus for a node to transmit RTS in a communication system, the apparatus comprising: a transmitting unit, configured to transmit a RTS for indicating a CTS scheduling information to a UE in an unlicensed band, the CTS scheduling information indicates the UE to send a CTS in uplink licensed band in response to the RTS; and a receiving unit, configured to receive CTS from the UE in the licensed band.

Advantageously, the CTS scheduling information includes time resource and frequency resource for the UE to transmit the CTS.

According to a fourth aspect of the invention, there is provided an apparatus for a UE to transmitting a CTS in a communication system, the apparatus comprising: a receiving unit, configured to receive a RTS for indicating a CTS scheduling information from a node in an unlicensed band, the CTS scheduling information indicates the UE to send a CTS in an uplink licensed band in response to the RTS; and a transmitting unit, configured to transmit the CTS based on the received CTS scheduling information.

Advantageously, the CTS scheduling information includes time resource and frequency resource for the UE to transmit the CTS.

Based on the scheme in the present application, in an explicit or implicit manner, the scheduling signaling overhead can be reduced and the co-existence problem between LTE-U/LTE-U or between LTE-U/WiFi can be efficiently mitigated.

The aspects of the present application will become apparent through the description of concrete embodiments hereafter.

BRIEF DESCRIPTION OF THE DRAWINGS

The invention is explained in further detail, and by way of example, with reference to the accompanying drawings wherein.

DETAILED DESCRIPTION

Figure 1:
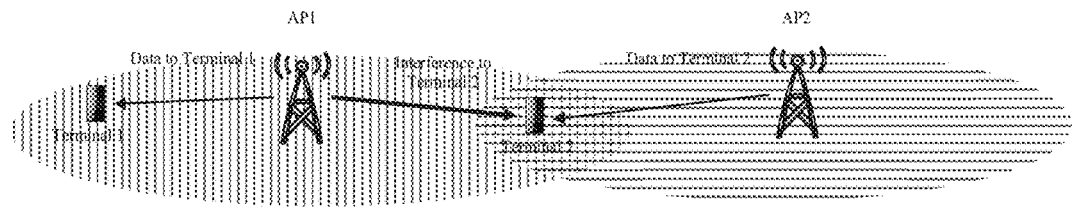
FIG. 1 illustrates a schematic view of hidden terminal interference between Wi-Fi Access Points.
Figure 2:
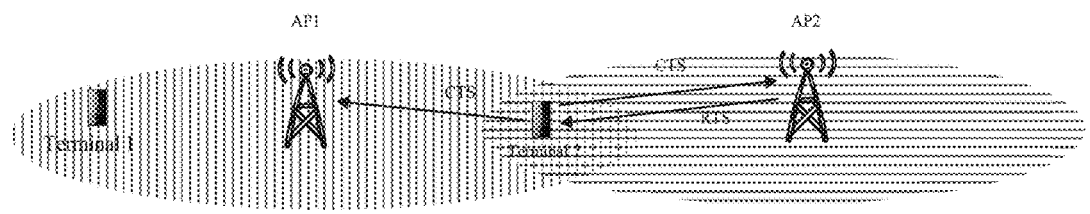
FIG. 2 illustrates a schematic view of CSMA/CA for avoiding hidden terminal interference between Wi-Fi Aps.

Exemplary aspects of the present invention will be described herein below. More specifically, exemplary aspects of the present application are described hereinafter with reference to particular non-limiting examples and to what are presently considered to be conceivable embodiments of the present application. A person skilled in the art will appreciate that the invention is by no means limited to these examples, and may be more broadly applied. It is to be noted that the following description of the present application and its embodiments mainly refers to specifications being used as non-limiting examples for certain exemplary network configurations and deployments. Hereinafter, various embodiments and implementations of the present application and its aspects or embodiments are described using several alternatives. It is generally noted that, according to certain needs and constraints, all of the described alternatives may be provided alone or in any conceivable combination (also including combinations of individual features of the various alternatives).

The present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

The main conceptual idea is to provide a scheme for scheduling CTS in communication networks. The scheme comprises that a node, e.g. base station transmits a RTS for indicating a CTS scheduling information in an unlicensed band to an UE, the CTS scheduling information indicates the UE to transmit the CTS in response to the RTS.

In the following description of the present application, the node may be LTE-U eNB, may also be a base station which is applicable to the unlicensed band. For LTE/U eNB, "user equipment" (UE) shall be an UE which belongs to LTE-U network. "Terminal" shall be a terminal device which belongs to Wi-Fi network.

In one example of the present application, eNB transmits a RTS for indicating a CTS scheduling information to a UE in an unlicensed band, the CTS scheduling information in the RTS is used to indicate the LTE to send a CTS in uplink licensed band in response to the RTS. The CTS scheduling information may explicitly include time resource and frequency resource for the UE to transmit the CTS and may be in the format of PDCCH or EPDCCH. For example, the CTS scheduling information can be DCI Format 0 which includes the time resource and frequency resource information.

Preferably, the CTS scheduling information in the above RTS may include sub-frame indicator for indicating the UE to transmit the CTS in the sub-frame indicated by the sub-frame indicator. For example, if a sub-frame indicator k is included in the CTS scheduling information, the UE transmits the CTS in k-th sub-frame after receiving the RTS.

For example, k=6, the UE transmits the CTS in 6-th sub-frame after receiving the RTS. Thus, CTSs from different UEs may spread in time domain in order to avoid the contention and provide the flexibility.

If sub-frame indicator k is not included in the CTS scheduling information, UE may transmit the CTS to eNB in a pre-defined sub-frame. Usually based on the processing time and uplink/downlink channel configuration, as an example, k=4.

In another example, a pre-RTS can be used to implicitly indicate the UE to search the followed CTS scheduling information. At first, eNB transmits a pre-RTS to the UE, the format of the pre-RTS may be the same as that of the Wi-Fi RTS. The pre-RTS implicitly indicates the LTE to search the RTS which may be in the format of Physical Downlink Control Channel (PDCCH) or Enhanced-Physical Downlink Control Channel (EPDCCH) and include the CTS scheduling information. For example, the CTS information can be DCI Format 0 which includes the time and frequency resource. In addition, a new RNTI (Radio Network Temporary Identify), e.g. CTS-RNTI can be used by the UE on the PDCCH/EPDCCH search space when it tries to blind decode for the CTS scheduling information. For example, a CTS-RNTI is pre-configured in the UE, eNB transmits the RTS masked by the CTS-RNTI to the UE, when the UE tries to receive the RTS in PDCCH or EPDCCH, UE blindly decodes RTS with CTS-RNTI for reducing the time of the blind decoding dramatically.

In the above mentioned implicit scheme, if the pre-RTS does not include the sub-frame indicator which indicates when the UE shall receive the RTS including the CTS scheduling information, the pre-RTS may indicate the UE to search the RTS in the pre-defined sub-frame associated with the pre-RTS.

In the above mentioned implicit scheme, the pre-RTS may include a second sub-frame indicator for indicating the UE to search the RTS including the CTS scheduling information. For example, the pre-RTS includes a second sub-frame indicator k2, UE receives the RTS in the k2-th sub-frame indicated by the second sub-frame indicator after receiving the pre-RTS. As an example, k2=0, UE receive the RTS in the same sub-frame for receiving the pre-RTS. Yet as another example, k2=2, UE receive the RTS in the 2nd after the sub-frame for receiving the pre-RTS.

In another example of the present application, eNB transmits a RTS to a UE, the format of this RTS may be the same as the format of the Wi-Fi RTS. The resource for transmitting the RTS by eNB implicitly indicates the time and frequency resource for the UE to transmit the CTS. That is, the resource for transmitting the RTS by eNB is associated with the time and frequency resource of the CTS for responding the RTS by the UE. For example, the RTS may occupy a finite set of resources in the unlicensed band, and the index to each resource in this set would be used as an input to a function that calculates the PRB resources to be used for CTS after k sub-frames. This said function can be specified in the specifications or signaled to the UE in a proper signaling message.

In one example of the present application, the RTS indicates whether UE transmits one or multiple CTSs.

In yet another example, the CTS scheduling information in the RTS may indicate that the RTS does not include CTS scheduling information. For example, when there are only unlicensed bands and no licensed band, or licensed band is not available temporarily duo to high load, then the need for CTS scheduling information in the RTS is not applicable. Thus, the CTS scheduling information in the RTS indicates that the RTS does not include CTS scheduling information.

In one example of the present application, after receiving the RTS or pre-RTS from eNB, according to the contained implicit or explicit indication, the UE may transmit the CTS in PUCCH (Physical Uplink Control CHannel) or PUSCH (Physical Uplink Shared CHannel).

In one example of the present application, after receiving the RTS or pre-RTS from eNB, according to the contained implicit or explicit indication, the UE may transmit one or multiple CTSs. For example, UE transmits one CTS in a licensed band and another CTS in an unlicensed band, the CTS transmitted in the unlicensed band is targeted at Wi-Fi AP or eNB with WLAN capability in an downlink and uplink unlicensed band, the format of the CTS in the licensed band and in the unlicensed band may be different.

Figure 3:
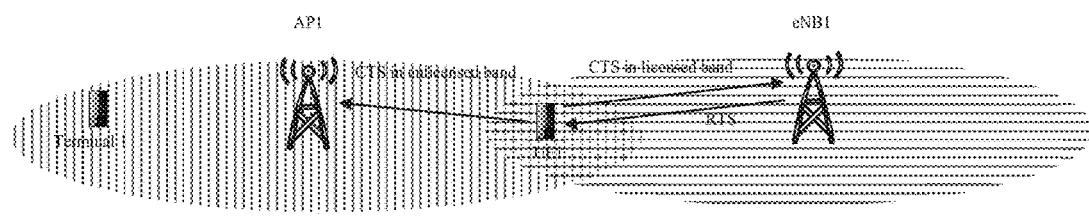
FIG. 3 illustrates a schematic view of a UE transmitting a CTS between Wi-Fi Access Point and base station using unlicensed channel in accordance to an example in present application.

FIG. 3 illustrates a schematic view of a UE transmitting CTS between Wi-Fi access point and base station using unlicensed channel in accordance to an example in the present application.

In FIG. 3, UE1 is within the coverage of Wi-Fi AP1 and LTE-U eNB1. Terminal 1 is under the coverage of AP1 but not under the coverage of eNB1. eNB1 wishes to transmit data to UE1 over the unlicensed band and after listening to the unlicensed channel to determine that it is free, it sends a RTS to UE1. This RTS contains a DCI Format 0 extension containing PUSCH scheduling information for the UE to transmit the CTS response over the licensed band. UE1 listens to the channel to determine whether it is free. In this example, the channel is not used. As per an above embodiment, after k=4 sub-frames of receiving the RTS, UE1 encode the CTS message and transmit it using the scheduled PUSCH resource to eNB1 over the licensed band. At the same time, it also transmits a CTS using the unlicensed band. eNB1 upon receiving the CTS from UE1 would then proceed to transmit downlink data to UE1. AP1 upon receiving the CTS from UE1 would refrain from transmitting any downlink data to Terminal 1.

Figure 4:
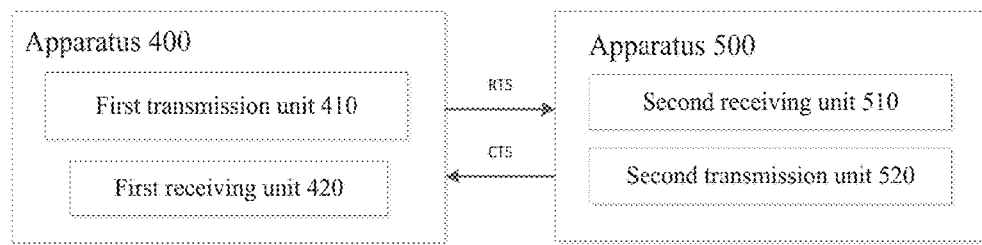
FIG. 4 illustrates an apparatus schematic view for scheduling CTS in a communication networks in accordance to an example in present application.

FIG. 4 illustrates an apparatus schematic view for scheduling CTS in a communication networks in accordance to an example in present application. The apparatus 400 in FIG. 4 may be the node in a communication network. Apparatus 400 comprises first transmitting unit, configured to transmit a RTS for indicating a CTS scheduling information to a UE in an unlicensed band, the CTS scheduling information is used to indicate the UE to send a CTS in uplink licensed band in response to the RTS; and first receiving unit, configure to receive CTS from the UE in the licensed band. The CTS scheduling information in apparatus 400 may explicitly include the time resource and frequency resource for the UE to transmit the CTS.

The apparatus 500 in FIG. 4 may be a UE in a communication network. Apparatus 500 comprises second receiving unit, configured to receive a RTS for indicating a CTS scheduling information from a node in an unlicensed band, the CTS scheduling information is used to indicate the UE to send a CTS in an uplink licensed band in response to the RTS; and second transmitting unit, configured to transmit the CTS based on the received CTS scheduling information. The CTS scheduling information in apparatus 500 may explicitly include the time resource and frequency resource for the UE to transmit the CTS.

It should be noted that the above described embodiments are given for describing rather than limiting the invention, and it is to be understood that modifications and variations may be resorted to without departing from the spirit and scope of the invention as those skilled in the art readily

What is claimed is:

1. A method for a node to schedule a clear to send (CTS) in a communication network, the method comprising:
   transmitting, to a user equipment (UE) using an unlicensed band, a request to send (RTS) indicating CTS scheduling information, the CTS scheduling information indicates to the UE to send a CTS to the node in an uplink licensed band in response to the RTS, the CTS scheduling information includes a sub-frame indicator which indicates to the UE to transmit the CTS in the sub-frame indicated by the sub-frame indicator.

2. The method of claim 1, wherein the CTS scheduling information includes time resource and frequency resource for the UE to transmit the CTS.

3. The method of claim 1, further comprising:
   transmitting a pre-RTS before transmitting the RTS, wherein the pre-RTS indicates to the UE to search the RTS and the RTS includes CTS—radio network temporary identifier (CTS-RNTI) information for the UE to decode the RTS.

4. The method of claim 3, wherein the pre-RTS indicates the UE to search the RTS in a pre-defined sub-frame associated with the pre-RTS.

5. The method of claim 1, wherein a resource for transmitting the RTS indicates the frequency and time resource for the UE to transmit the CTS.

6. The method of claim 1, wherein scheduling information indicates that the RTS does not include scheduling information for a CTS when a licensed band is not available.

7. The method of claim 1, further comprising:
   receiving the CTS from the UE in the licensed band.

8. A method for a user equipment (UE) to transmit a clear to send (CTS) in a communication system, the method comprising:
   receiving, from a node using an unlicensed band, a request to send (RTS) indicating CTS scheduling information, the CTS scheduling information indicates to the UE to send a CTS to the node in an uplink licensed band in response to the RTS, the CTS scheduling information includes a sub-frame indicator which indicates to the UE to transmit the CTS in the sub-frame indicated by the sub-frame indicator; and
   transmitting the CTS to the node based on the received CTS scheduling information.

9. The method of claim 8, wherein the CTS scheduling information includes time resource and frequency resource for the UE to transmit the CTS.

10. The method of claim 8, further comprising:
    receiving a pre-RTS before receiving the RTS, wherein the pre-RTS indicates to the UE to search the RTS, which includes CTS—radio network temporary identifier (CTS-RNTI) information for the UE to decode the RTS.

11. The method of claim 10, wherein the pre-RTS indicates the UE to search the RTS in a pre-defined sub-frame associated with the pre-RTS.

12. The method of claim 8, wherein a resource for transmitting the RTS indicates the time and frequency resource for the UE to transmit the CTS.

13. The method of claim 8, wherein the RTS includes an indicator for indicating the UE to transmit one or more CTS, when the indicator indicates the UE to transmit one CTS, the UE transmit the CTS in the uplink licensed band.

14. The method of claim 8, wherein the CTS is transmitted in physical uplink shared channel (PUSCH) or physical uplink control channel (PUCCH) in the uplink licensed band.

15. An apparatus for a node to transmit a request to send (RTS) in a communication system, the apparatus comprising:
    a transmitter configured to transmit, to a user equipment (UE) using an unlicensed band, a RTS indicating clear to send (CTS) scheduling information, the CTS scheduling information indicates to the UE to send a CTS to the node in an uplink licensed band in response to the RTS, the CTS scheduling information includes a sub-frame indicator which indicates to the UE to transmit the CTS in the sub-frame indicated by the sub-frame indicator; and
    a receiver configured to receive, from the UE in the licensed band, the CTS.

16. The apparatus of claim 15, wherein the CTS scheduling information includes time resource and frequency resource for the UE to transmit the CTS.

17. An apparatus for a user equipment (UE) to transmit a clear to send (CTS) in a communication system, the apparatus comprising:
    a receiver configured to receive, from a node using an unlicensed band, a request to send (RTS) indicating CTS scheduling information, the CTS scheduling information indicates to the UE to send a CTS to the node in an uplink licensed band in response to the RTS, the CTS scheduling information including a sub-frame indicator which indicates to the UE to transmit the CTS in the sub-frame indicated by the sub-frame indicator; and
    a transmitter configured to transmit the CTS to the node based on the received CTS scheduling information.

18. The apparatus of claim 17, wherein the CTS scheduling information includes time resource and frequency resource for the UE to transmit the CTS.

19. A method for a node to schedule a clear to send (CTS) in a communication network, the method comprising:
    transmitting, to a user equipment (UE) using an unlicensed band, a request to send (RTS) indicating CTS scheduling information, the CTS scheduling information indicates to the UE to send a CTS in an uplink licensed band in response to the RTS;
    transmitting, to the UE, a pre-RTS before transmitting the RTS, wherein the pre-RTS indicates to the UE to search the RTS, wherein the RTS includes CTS—radio network temporary identifier (CTS-RNTI) information for the UE to decode the RTS.

* * * * *